United States Patent [19]

Abbe

[11] 3,771,051

[45] Nov. 6, 1973

[54] APPARATUS AND METHOD FOR INDICATING SURFACE ROUGHNESS

[75] Inventor: Robert C. Abbe, Newton, Mass.

[73] Assignee: ADE Corporation, Watertown, Mass.

[22] Filed: June 14, 1972

[21] Appl. No.: 262,520

[52] U.S. Cl. ............................................. 324/61 R
[51] Int. Cl. ................................................ G01r 27/26
[58] Field of Search ........................ 324/61 R, 61 P; 317/246

[56] References Cited
UNITED STATES PATENTS

| | | | |
|---|---|---|---|
| 3,187,256 | 6/1965 | Foster | 324/61 R |
| 3,353,098 | 11/1967 | Foster et al. | 324/61 R X |
| 3,452,273 | 6/1969 | Foster | 324/61 R |
| 3,488,581 | 6/1970 | Foster | 324/61 R |
| 3,504,279 | 3/1970 | Foster et al. | 324/61 R |
| 3,555,416 | 1/1971 | Lucka | 324/61 R |

Primary Examiner—Stanley T. Krawczewicz
Attorney—C. Yardley Chittick et al.

[57] ABSTRACT

A non- contacting capacitive probe positioned adjacent a moving surface whose roughness is to be indicated provides a signal which corresponds to the distances between the sensing end of the probe and those points comprising the successive adjacent portions of the surface. This signal is twice differentiated to provide an indication of surface roughness. Preferably, the signal is also filtered to attenuate noise and those components of the signal arising from variations in the distance between the probe and the surface caused by non-uniform movement of the surface. Additionally, the transducer's signal is modified to obtain an output which is independent of the distance between the probe and surface; this is achieved by multiplying the twice differentiated signal by scaler values corresponding to the inverse of the distance between the probe and surface.

38 Claims, 9 Drawing Figures

APPARATUS AND METHOD FOR INDICATING SURFACE ROUGHNESS

BACKGROUND OF THE INVENTION

There are numerous situations where it is either necessary or desirable to be provided with an indication of the roughness of a surface, i.e., the height of the bumps and depressions on the surface. For example, such an indication is necessary when inspecting paper feed rolls being manufactured for office copying machines. Another example may be in checking whether a machined surface meets specification. In the first case, the roughness of the surface will probably consist of randomly arranged bumps and depressions in two dimensions while surface roughness of a machined part may comprise fairly regular, substantially parallel ridges and valleys.

In some applications, an average value of surface roughness may be required. In other situations, it may be necessary to determine whether the surface being inspected has bumps or depressions of a particular width.

There have been many previous approaches to measuring surface roughness with a probe which is fixed adjacent a moving surface that is to be inspected. Some of these probes have of necessity been required to contact the surface while others have been of the non-contacting variety. Generally, probes of the non-contacting type are more useful since wear and other problems are avoided. However, such non-contacting probes may encounter a problem in providing an output which is insensitive to the distance at which its sensing end is held from the surface. Additionally prior non-contacting probes have been unable to provide repeatable precise surface roughness measurements.

OBJECTS AND SUMMARY OF THE INVENTION

It is a general object of this invention to provide an apparatus and method for indicating the roughness of a surface in an accurate, economical and reliable manner with repeatable precise measurements.

It is a further object to provide an apparatus and method for indicating the roughness of a surface which utilizes a non-contacting probe and simple, easily available components.

It is a further object to provide an apparatus and method for indicating the roughness of surfaces which may have either randomly or regularly arranged surface irregularities entending in either one or two directions.

It is an additional object of this invention to provide an apparatus and method for indicating only bumps or depressions of a particular width or for providing an average indication of the irregularities in a surface being inspected.

It is a further object of this invention to provide an apparatus and method for indicating the roughness of a surface with a non-contacting probe which is insensitive to the distance between the probe and the surface.

These and other objects are achieved according to the invention where the output signal from a transducer indicating the distance between itself and points on the surface to be inspected as the surface moves past the transducer is modified to compensate for distortions due to the different widths of the bumps and depression on the surface. Preferably, the signal is differentiated at least once and this differentiated signal is used an an indication of surface roughness. Where irregularities extend in two directions, the transducer signal is differentiated twice.

Preferably, the transducer signal is also passed through a high-pass filter to eliminate those components in the signal due to non-uniform movement of the surface past the transducer. It is also preferable to pass the signal through a low-pass filter to attenuate system noise.

In order to achieve a roughness-indicating signal which is independent of the distance between the transducer and the surface, the output signal from the transducer is modified by scalar values corresponding to the inverse of the distance between the transducer and the surface. These scalar values may be obtained directly by inverting the transducer'output.

DESCRIPTION OF THE PREFERRED EMBODIMENTS

Figure 1:
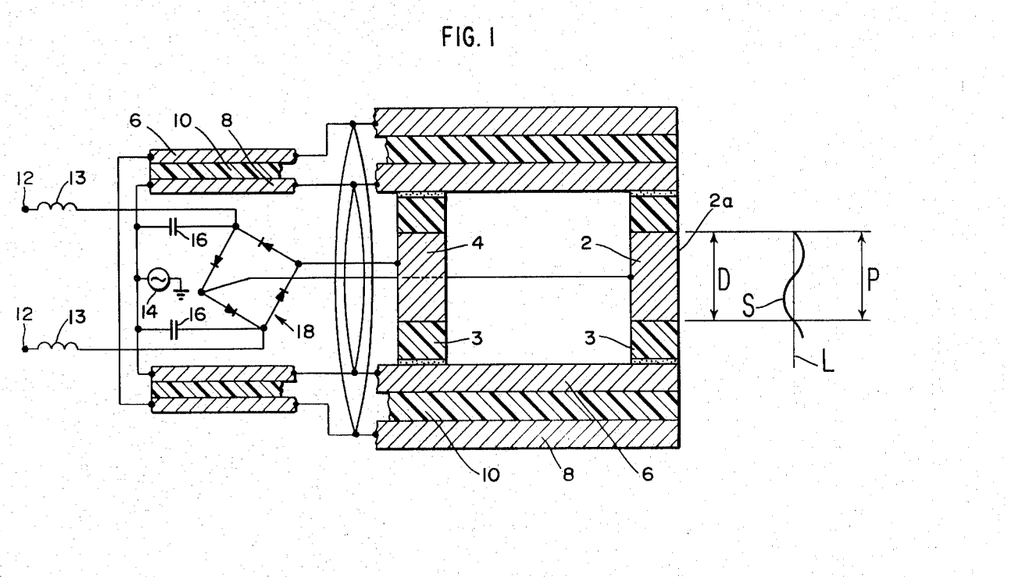
FIG. 1 is a partly schematic, partly sectional view of a capacitive probe which is preferably used in the preferred embodiments of the invention.

FIG. 1 shows a preferred form of a transducer probe for use with the invention. The probe is of the non-contacting capacitive type and corresponds to the probe disclosed and claimed in co-pending patent application Ser. No. 64,240, now U.S. Pat. No. 3,706,919, entitled "CAPACITIVE GAUGE," by the same inventor and assigned to the same assignee as is the present application. More particularly, FIG. 1 is similar to FIG. 8 of this co-pending application. In FIG. 1, the probe is made up of a cylindrical housing comprising an outer conductor 8 and an inner conductor 6 having between them a dielectric spacer 10. A circular measuring electrode 2 and a corresponding circular balancing electrode 4 are provided and connected to a diode matrix 18 in the circuit illustrated. Ring-shaped dielectric members 3 mount the electrodes within the housing. An oscillator 14 is provided which is connected to the diode matrix 18 through a pair of capacitors 16 to energize the measuring and balancing electrodes. The diode matrix is also connected to the probe's output terminals 12 through a pair of inductors 13. As shown in FIG. 1, the measuring electrode has a flat outer face 2a of diameter D and which faces the surface S whose roughness is to be determined. Although the probe illustrated has a cylindrical housing and circular electrodes, these may be otherwise shaped.

In operation, the surface S is considered to be at ground potential and at the terminals 12 there is provided a measure of the distance in the capacitance to ground between the measuring and balancing electrodes when they are excited by the oscillator 14. The circular measuring electrode 2 of diameter D is adjacent a corresponding portion P of the same diameter on the surface S whose roughness is to be indicated. The portion P is essentially parallel to the flat electrode face 2a and the output of the probe at terminals 12 corresponds to an average value of the perpendicular distances between the outer face 2a of the measuring electrode and those points on the surface S making up the portion P.

The housing of the probe shown in FIG. 1 as above noted, has a inner cylindrical conductor 6 and this is also connected to the oscillator 14 to act as a driven guard and assist in obtaining a straight electric field between the entire outer face 2a of the measuring electrode and the portion P of surface S. The driven conductor element 6 enables the probe to provide an accurate signal corresponding to the average of the perpendicular distances between the outer face 2a of the measuring electrode and the points making up the portion P on the surface S.

As indicated in FIG. 1, the surface S has bumps and depressions extending above and below some datum line L which may be considered as defining the surface to be inspected when roughness is neglected, roughness being the height of these bumps and depressions. Since the output of the probe responds to the average of the distances between the outer face 2a and the points on the surface making up portion P, its output may be utilized to provide an indication of the bumps and depressions in successive adjacent portions P of the surface S as the surface is moved past the probe, with essentially a constant distance being maintained between face 2a and datum line L.

Figure 2:
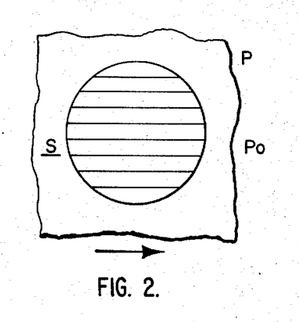
FIGS. 2, 3 and 4 illustrate a principle of operation of the preferred embodiments.

Referring to FIG. 2, it may be seen that the portion P of the surface S adjacent the probe may be considered as consisting of a plurality of strips extending longitudinally with respect to the surface's direction of motion indicated. The strips obviously are of different lengths because of the circular shape of portion P.

The cross-sectional view of the surface S shown in FIG. 1 is, of course, a view through the central longitudinal strip po (of a length equalling D) shown in FIG. 2. Considering only the output of the probe provided in response to this strip, it may be seen that where the points making up this strip po of portion P are located so that the average distance from the datum line of those above the datum line approximately equals the average distance from the line of those points below the datum line, the signal provided will not respond to any roughness in the strip po since the bumps and depressions will cancel each other. That is, in such instances the output of the probe responds as if no surface roughness were present within this strip po of the portion P.

It it is assumed that the surface irregularities are made up of essentially sine waves, as illustrated in FIG. 1, where the wavelength B of the wave at strip po of portion P essentially equals D the pumps and depressions cancel each other and the output of the probe is incorrect. In fact, similar situations will occur whenever the distance D is an integer times the wavelenth B. At these occasions the probe will not sense any surface roughness on strip po.

Conversely, where the distance D is one half an odd integer of the wavelength B the strip po of the portion P adjacent the outer face 2a of the measuring electrode will be entirely made up of either a bump or a depression so that the probe's response to the strip po will be some type of peak indication. Additionally, with a sine wave assumed, those surface irregularities having longer wavelengths will have higher bumps and lower depressions so that the output of the probe will be higher for irregularities of longer wavelengths and will decrease as the wavelengths decrease.

Figure 3:
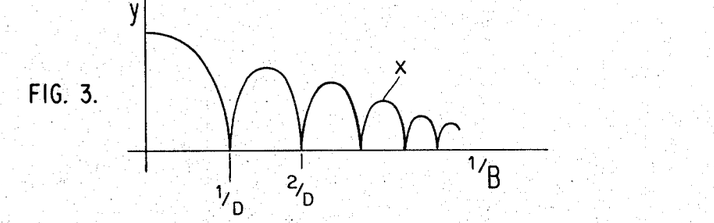

FIG. 3 illustrates with respect to the strip po these relationships between the amplitude of that portion of the probe's output Y relating to surface irregularities (i.e., distances above and below the datum line L) and the wavelengths B of the assumed sine waves. With Y plotted vs. 1/B, FIG. 3 illustrates that this portion of the probe's output relating to strip po is zero where 1/B is equal to 1/D, 2/D, 3/D, etc. Additionally, where 1/B is equal to ½ D, 3/2 D etc., high peaks are encountered. Further, as the wavelength decreases, the output Y of the probe decreases.

Similar relationships exist with respect to each of the other strips shown in FIG. 2 as making up the portion P. Of course, since only the central strip po is of length D, depending on the different lengths of the strips distortions due to different width surface irregularities will occur in response to different wavelengths. For each strip, that portion of the probe's output relating to it is distorted as shown in FIG. 2 except that the values of 1/B differ in response to the different lengths of the various strips.

Figure 4:
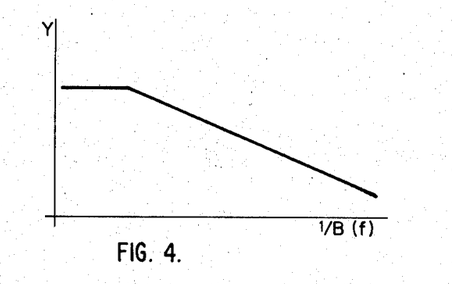

FIG. 4 shows the relationship between the probe's output and the inverse of the wavelength B of the surface irregularities when all the strips making up the portion P of the surface are taken into account. In effect, all the Y versus 1/B curves relating to the various strips are superimposed on each other.

Experimentally it has been confirmed that actual probe outputs relating to surface irregularities approximate the relationships illustrated in FIGS. 3 and 4 which are based on assumed sine shaped roughness. It should also be noted that these figures are concerned with surface irregularities in the one dimension of the surface shown in FIG. 1 which extends longitudinally with respect to the strips shown in FIG. 2. However, surface roughness generally is in two dimensions so that these distortions in the probe's output due to different wavelength irregularities will generally be encountered in two dimensions.

The output of the probe must be modified to overcome these distortions caused by different wavelength surface irregularities. With the invention, the surface is moved past the probe at a constant velocity so that the graph of FIG. 4 may be considered as a plot or probe output vs. the frequency ($f$) as well as the probe output vs. the inverse of the wavelength B of the bumps and depressions. The amplitude of output of the probe thus responds to surface roughness in a distorted manner dependent upon the frequency at which the bumps and depressions pass the probe. By feeding this distorted probe output through frequency dependent circuits, the invention provides roughness indications independent of the wavelengths at which the bumps and depressions occur.

Referring again to FIG. 4, when this graph is considered as probe output versus frequency $f$, the curve starts initially horizontal and thereafter moves downwardly at a fixed slope which is $1/f$. Where two dimensional roughness is being inspected, the probe's output is distorted due to different wavelength irregularities occuring in both directions and the output of the probe inspecting such a surface decreases at a slope equal to $1/f^2$.

Thus, with one dimensional roughness, since the probe's output is distorted due to different wavelengths of the surface irregularities in a straight line relationship, decreasing at a slope proportional to the frequency of the bumps and depressions, by differentiating the probe's signal these distortions may be removed. Where the distortions are due to different wavelengths in two dimensions and the probe output versus frequency curve decreases at a rate of $1/f^2$, the probe's output is twice differentiated.

Figure 5:
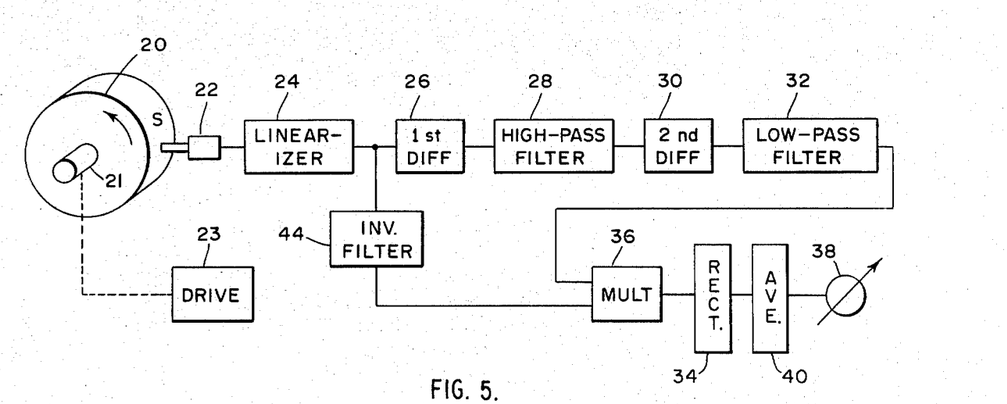
FIG. 5 is a schematic block diagram of a preferred embodiment of the invention.

FIG. 5 shows a preferred embodiment of the invention where a cylindrical piece 20 having a surface S whose roughness is to be indicated is mounted for rotation on a shaft 21 which is driven by a constant speed drive 23. A transducer probe 22 of the type shown in FIG. 1 is fixed adjacent the moving surface S so that, as in FIG. 1, successive portions P pass the outer face 2a of its measuring electrode. The output of the transducer is fed to a linearizer circuit 24 which shapes the analog probe output. The output of the linearizer may be considered as containing a component indicating the average distance between the sensing end of the probe and the surface S (that is, the outer face 2a to the line L in FIG. 1) and components indicating the bumps and depressions in the two dimensional portions P of the surface S. These latter components are distorted due to the effect of different wavelength surface irregularities.

As shown in FIG. 5, the output of the linerizer is fed to a first differentiating circuit 26 and the differentiated signal is thereafter fed to a high-pass filter 28, a second differentiating circuit 30 and a low-pass filter 32. By differentiating the transducer's output the distortions noted above due to the different wavelengths of the bumps and depressions making up the surface irregularities are attenuated. Thus, the first differentiating circuit 26 and the second differentiating circuit 30 are provided for twice differentiating the transducer's output signal and thereby respectively compensate for these distortions in the two dimensions of the successive portions P. Each of the two differentiators acts as a filter having the inverse characteristics of the frequency-amplitude relationship discussed above in connection with FIG. 4.

Since the element 20 will almost always be mounted on shaft 21 with some small eccentricity, as the member 20 rotates the average distance between its surface S and the transducer probe 22 will periodically vary. That is, in FIG. 1, the distance between the line L and the outer face 2a of the measuring electrode will periodically increase and decrease as the element 20 having surface S rotates. The high-pass filter 28 is provided to attenuate this frequency component of the transducer's output due to the non-uniform eccentric movement, commonly termed run-out. The low-pass filter 32 is provided to attenuate noise within the system. Thus, at the output of the low pass filter shown in FIG. 3, the components of the signal relating to run-out and noise have been attenuated. Distortions caused by the different wavelengths of the surface irregularities have also been removed.

With reference to FIGS. 4 and 5 together, the horizontal beginning of the curve in FIG. 4 is concerned with low frequency components which really are related to run out and not surface irregularities. These components, as noted above, are attenuated by the high-pass filter 28. The higher frequency signal components relating to surface roughness lying in the range of the sloped line of the curve are those that are differentiated to compensate of the different wavelength irregularities.

As previously noted, prior probes have been unable to provide roughness indicating outputs which are independent of the distance between their sensing ends and the surface S. With respect to the embodiment of FIG. 5, the output of the low-pass filter 32 does not exactly indicate the true surface since it is distorted due to the effect of this distance. To correct the signal it is fed to a multiplier 36 along with the output of the linearizer 24 which is received by the multiplier via an inverter-filter 44. The inverter-filter 44 contains a low-pass filter preset to eliminate those high frequency signal components due to surface irregularities, so that the output of the inverter-filter 44 corresponds to an inversion of the average distance between the surface and sensing end of the probe, i.e., the distance between the datum line L and the outer surface 2a of the measuring electrode 2 shown in FIG. 1. The inverter-filter 44 also contains suitable voltage biasing means to provide an output always having a positive voltage. The multiplier is thereby provided with a continual indication of this inverted distance which is used as a scalar factor to modify the signal from filter 32. It has been found that this provides a system where the surface roughness indicating output is independent of the distance between the sensing end of the transducer and the datum line L of the surface S. Thus, the element 20 may be replaced by another element of a somewhat larger or smaller diameter and the system will sense the surface roughness of this new element.

Therefore, in FIG. 5, at the output of the multiplier 36 is provided a signal which corresponds to the surface roughness in both directions of the two dimensional surface S and which signal is independent of system noise, the distance between the sensing end of the transducer and the surface and eccentric rotation of the surface.

The output of the multiplier is thereafter fed to a rectifying circuit 34 and converted to positive voltage signals corresponding to the absolute value of the multiplier's output. Thereafter the signals are averaged by an averaging circuit 40 and the averaged signal is indicated on a gauge 38. Alternatively, the output of the averaging circuit could be charted. The averaging circuit 40 averages its input over a particular length of time or movement of the surface, for example, the period of revolution of the surface.

Of course, the order in which the differentiating circuits, 26, 30, the high-pass filter 38 and low-pass filter 32 are connected is of no relevance. Where the surface is known to comprise only ridges and valleys in substantially only one direction, as with a machined part, the embodiment shown in FIG. 3 would be modified to eliminate the second differentiating circuit 30.

Figure 6:
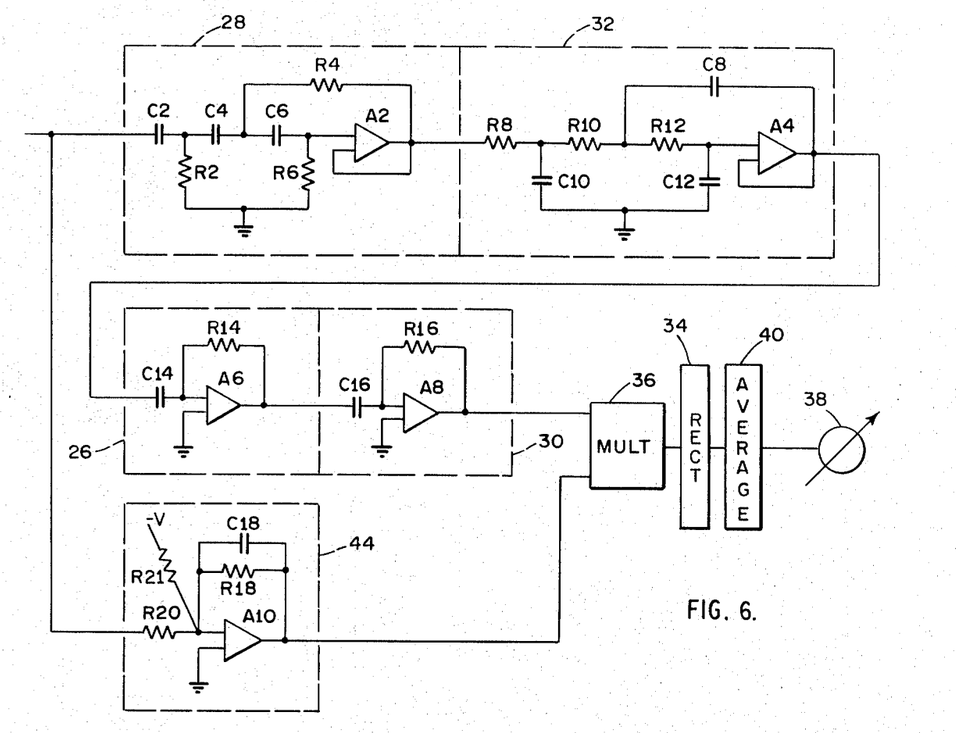
FIG. 6 is a schematic diagram of another preferred embodiment of the invention.

FIG. 6 shows another preferred embodiment of the invention. The input to the circuit of FIG. 6 is from the linearizer 24 shown in FIG. 5. Additionally, elements in FIG. 4 which correspond to elements in FIG. 3 are given the same reference numerals. In the embodiment of FIG. 4, the linearized output signal of the probe is fed through the high-pass filter 28 and low-pass filter 32 and thereafter to the first differentiating circuit 26 and second differentiating circuit 30.

The high-pass filter 28 is made up of capacitors C2, C4 and C6 connected in series and to the input of an operational amplifier A2. A resistor R4 is connected in a feedback loop from the operational amplifier A2 and between capacitors C4 and C6. Parallel connected resistors R2 and R6 extend between ground and the series connected capacitors as illustrated. As explained when discussing FIG. 5, the high-pass filter 28 eliminates distortions in the transducer's output signal due to run-out or eccentric mounting of the element 20. The high-pass filter 28, substantially eliminates the low frequency wave caused by eccentricity so that only the high frequency components due to surface irregularities pass.

The output of the filter 28 is fed to low-pass filter 32 which in FIG. 6 is shown as comprising serially connected resistors R8, R10 and R12 which are connected to one input of an operational amplifier A4. A capacitor C8 is connected in a feedback loop from the operational amplifier and between resistors R10 and R12. Capacitor C10 and C12 are connected in parallel between ground and the resistors as shown. As noted when discussing FIG. 5, the low-pass filter 32 helps to eliminate system noise. It thus produces an output which indicates the roughness of the surface as it moves past the sensing end of the transducer. However, this signal is distorted due to the different wavelengths of the surface irregularities as noted above.

These distortions are compensated for by the first and second differentiating circuits 26 and 30. As shown in FIG. 4, each differentiating circuit comprises an operational amplifier A6, A8 with a capacitor C14, C16 connected at its input and a feedback resistor R14, R16. The signal from the second differentiating circuit 30 indicates the surface irregularities with the distortions due to different waveforms in two directions being compensated for.

As also shown in FIG. 6, the input from the linearizer is fed via inverter-filter 44 to the multiplier 36 in the same manner as above noted when discussing FIG. 5. The output of the multiplier thus corresponds to the transducers signal after being corrected for distortions due to the distance between the surface being inspected and the sensing end of the transducer. As shown in FIG. 6, the inverter filter comprises an operational amplifier A10 connected in the circuit illustrated to provide inversion. A capacitor C18 and resistor R18 are connected in a feedback loop between the amplifier's output and a resistor R20. The capacitor C18 is selected so that circuit 44 acts as a low-pass filter to attenuate the high frequency components in the signal due to surface irregularities. A biasing voltage (-V) is applied as indicated through a biasing resistor R21 so that the output of inverter-filter 44 provides a positive signal indicating the inverse of the average distance between the probe and surface.

As shown in FIG. 6, the output of the multiplier is rectified by the circuit 34 and thereafter averaged by averaging circuit 40 before being fed to a gauge 38.

Figure 6A:
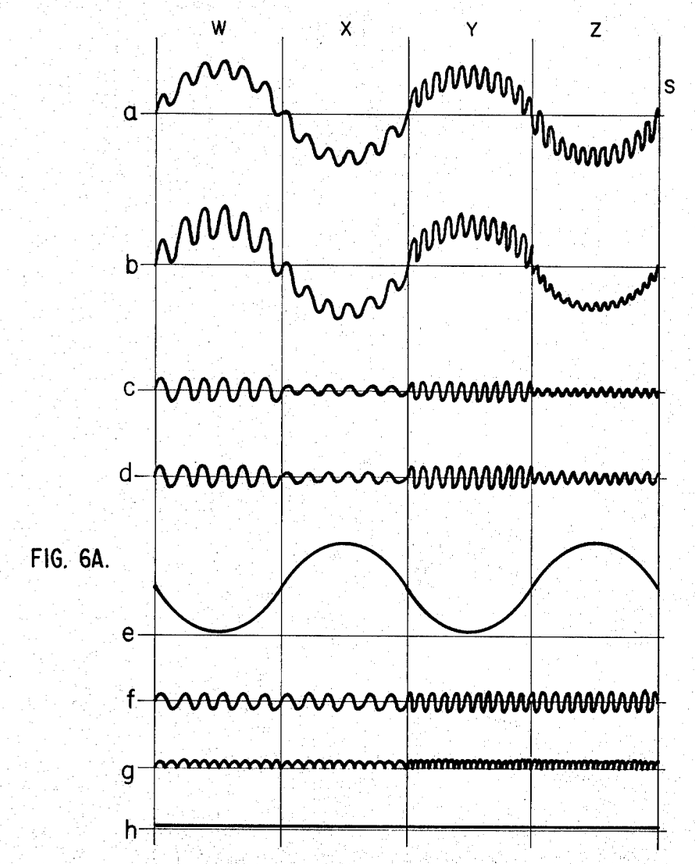
FIG. 6A illustrates waveforms useful for explaining the operation of the embodiment of FIG. 6.

FIG. 6A illustrates illustrative waveforms occurring within the embodiment of FIG. 6 for a hypothetical situation where all the surface irregularities are of the same height and thus the roughness of the surface is constant. Curve $a$ represents the distance, including surface roughness, between the surface S and sensing end of the transducer for one revolution of the surface. The distance between the surface and probe is periodically varying with the surface moving closer, farther away, closer and farther away during each revolution. Additionally the first half of the surface is indicated as having irregularities of large wavelengths with the last half of the surface inspected during each revolution having irregularities of smaller wavelength irregularities. For illustration, the surface is divided into four zones: W indicating relation closeness between the probe and surface with large wavelength irregularities; X indicating a portion of the surface which is further away but also has large wavelength irregularities; Y indicating a portion of the surface which again is closer but has surface irregularities of smaller wavelengths; and Z where the surface is farther away and has irregularities of small wavelengths.

In FIG. 6A, curve $b$ represents the output of the linearizer. Obviously, the low frequency basic wave is a response to the non-uniform movement of the surface with respect to probe and follows the basic shape of curve 2. The high frequency components of curve $b$ are due and correspond to the surface irregularities illustrated in curve $a$. These occur at the same frequency as those in curve $a$ but their amplitudes are effected or distorted by the average distance between the surface and probe. Thus, the high frequency waves in zone W have a greater amplitude than those in zone X and those in zone Y have a larger amplitude than those in zone Z.

Other distortions are also present in the signal represented by curve $b$. These are those explained above where irregularities of shorter wavelengths when sensed have less amplitude than those of large wavelengths. Thus, the high frequencies components in zone X have greater amplitude than those in zone Z even though both zones have irregularities of the same roughness (or height) and are the same distance from the probe. Similarly, the high frequency components in zone W are greater than those in zone Y.

Curve $c$ in FIG. 6A represents the signal obtained from the high-pass filter 28 where the low frequency components relating to non-uniform movement of the surface with respect to the probe causing the distance between the two to vary have been eliminated. Only the high frequency waves remain and they have the same amplitude relationships among the various zones as indicated above.

Curve $d$ of FIG. 6A represents the transducers output signal after it has been differentiated by circuits 26 and 30 in FIG. 6. With this signal, the distortions caused by different wavelength surface irregularities have been attenuated. Thus the amplitude of the waves in W and Y are equal. Similarly, the amplitude of the waves in X and Z are equal. At this point, the only distortion is due to the differences in the distance between the probe and surface.

The curve $e$ represents the output of the inverter-filter circuit 44 in FIG. 6. This curve corresponds to the transducer's output shown by curve $b$ except that the high frequency waves have been eliminated and the low frequency wave indicating the distance between the transducer and surface has been inverted. Additionally, this wave has been biased in the positive direction.

Curve $f$ of FIG. 6A represents the multiplier's 36 output signal. As indicated the multiplier compensates for the distance destortion so that in curve $f$, all the waves are off the same amplitude corresponding to the fact that all the surface irregularities were assumed as of the same height.

In FIG. 6A, curve g represents the rectified curve f and curve h, the averaged rectified curve g from the rectifier circuit 34 and averaging circuit 40 respectively.

Figure 7:
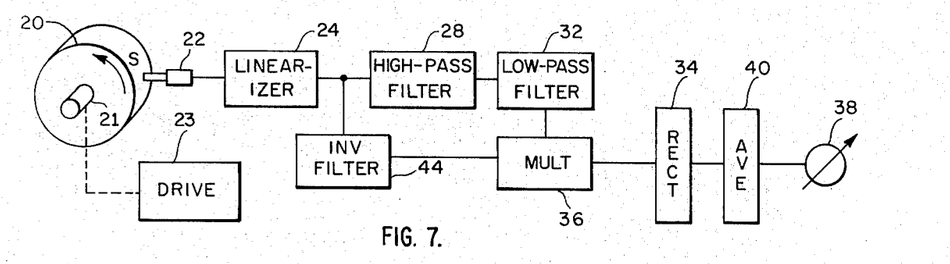
FIGS. 7 and 8 are schematic block diagrams of additional preferred embodiments of the invention.

FIG. 7 illustrates another embodiment of the invention and is for use when indicating roughness (i.e., the height of surface bumps and depressions) where the bumps and depressions are of substantially the same wavelength. In such a situation it is of course unnecessary to compensate for signal distortions due to different size wavelengths as is done with the embodiments above described. Thus, no differentiating circuits are provided. The output of linearizer 24 is fed directly through the high and low pass filters 28 and 32 to the multiplier. As with the previous embodiments the high and low pass filters attenuate the run-out and noise frequencies and the multiplier modifies the filtered signal by scalar values, corresponding to the inverse of the distance between the transducer 22 and surface S. The rectified and averaged signal from the multiplier is thereafter indicated by gauge 38. Alternately, if run out and noise problems did not exist, the linerizers output could be fed directly to the multiplier along with the signal from inverter-filter 44.

Figure 8:
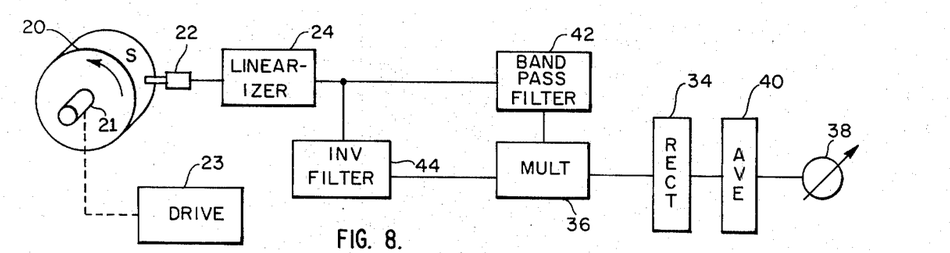

FIG. 8 illustrates yet another embodiment of the invention where a band-pass filter 42 is connected between the linerizer 24 and multiplier 36. This embodiment is useful where it is desired to inspect only for surface irregularities of a particular wavelength. The band-pass filter is selected to pass only those signals from the linearizer within the particular frequency range associated with the particular range of wavelength of interest. The range is small enough so that signal distortions due to different size wavelengths may be neglected and the differentiating circuits are not needed. Since in the normal situation, the frequency range passed by the band-pass filter will be greater than the critical frequency of the high-pass filter and less than that of the low pass filter, these latter two filters shown in the other embodiments are not needed. As in the other embodiments, the output of the band-pass filter is multiplied by scalar values from inverter-filter 44 and this result is rectified, averaged and indicated.

Thus, with the method and apparatus of the invention, irregularities in a moving surface are indicated with a transducer which provides a signal corresponding to the distance between its sensing end and the points making up successive adjacent portions of the surface being inspected. This transducer signal is modifed to compensate for distortions in the signal due to the wavelength of surface bumps and depressions in both directions, preferably by twice differentiating it. It is also fed through a high-pass filter to eliminate components of the signal which may be due to run-out or eccentric rotation of the surface. An additional low-pass filter may be provided to eliminate system noise. Also, the transducer's signal is fed to a multiplier which also receives a signal corresponding to the inverse of the distance between the sensing end of the transducer and the surface and thus modifies the tranducer's signal to compensate for distortion due to the effect of this distance. The output of the system may be rectified, averaged and then suitably indicated.

It will be appreciated that various changes in the form and details of the above described preferred embodiments may be effected by persons of ordinary skill in the art without departing from the true spirit and scope of the invention.

I claim:

1. An apparatus for indicating the roughness of a surface comprising:
   a transducer having a sensing end positioned adjacent a portion of said surface, said transducer adapted to generate an output signal corresponding to the distances between its sensing end and the points on said surface making up said portion;
   means for moving said surface past said sensing end; and,
   means for modifying the output signal of said transducer which is generated while said surface is moving to compensate for distortions in said signal due to different width bumps and depressions in said surface roughness.

2. The apparatus as recited in claim 1 wherein said transducer is a capacitance probe comprising:
   a measuring electrode at said sensing end;
   a balancing electrode;
   means for exciting both said electrodes with an alternating current; and,
   means for providing an indication of the difference in capacitance to ground between said measuring and balancing electrodes.

3. The apparatus as recited in claim 2 wherein said measuring electrode has a flat surface adapted to face said surface portion.

4. The apparatus as recited in claim 2 wherein said capacitive probe further comprises a guard surrounding said measuring electrode and driven by said exciting means.

5. The apparatus as recited in claim 1 wherein said modifying means comprises means for differentiating said output signal of said transducer.

6. The apparatus as recited in claim 5 and further including second differentiating means for differentiating the differentiated transducer generated signal from said first differentiating means.

7. The apparatus as recited in claim 5 wherein said moving means moves said surface past the sensing end of said tranducer at a constant velocity.

8. The apparatus as recited in claim 7 and further including a high-pass filter through which said transducer generated signal is passed to attenuate those frequency components in said signal arising fron non-uniform movement of said surface causing the distance between said surface and said sensing end to vary.

9. The apparatus as recited in claim 7 and further including a low-pass filter through which said transducer generated signal is passed to attenuate noise-generated high frequency components in said signal.

10. The apparatus as recited in claim 7 and further including means for rectifying said differentiated transducer signal, means for averaging the rectified signal over a known distance of said surface and means for indicating said averaged result.

11. The apparatus as recited in claim 7 and further including means for continually modifying said transducer generated signal by quantities corresponding to the inverse of the average distance from the sensing end of said transducer to its adjacent surface portion as said surface is being moved.

12. The apparatus as recited in claim 11 wherein said continual modifying means comprises:
   means for providing a signal indicating the inverse of said average distance; and,
   a multiplier adapted to receive said transducer generated signal and said inverse distance indicating signal to provide said modified transducer generated signal.

13. The apparatus as recited in claim 12 wherein said inverse distance indicating signal providing means comprises a low-pass filter adapted to receive the undifferentiated transducer generated signal to attenuate those frequency components in said signal arising from roughness of said surface, means for inverting said signal and means for biasing said signal.

14. The apparatus as recited in claim 1 wherein said moving means moves said surface past the sensing end of said transducer at a constant velocity.

15. The apparatus as recited in claim 1 and further including means for continually modifying said transducer generated signal by quantities corresponding to the inverse of the average distance from the sensing end of said transducer to its adjacent surface portion as said surface is being moved.

16. The apparatus as recited in claim 15 wherein said continual modifying means comprises:
   means for providing a signal indicating the inverse of said average distance; and,
   a multiplier adapted to receive said transducer generated signal and said inverse distance indicating signal to provide said modified transducer generated signal.

17. The apparatus as recited in claim 16 wherein said inverse distance indicating signal providing means comprises a low-pass filter adapted to receive the uncompensated transducer generated signal to attenuate those frequency components in said signal arising from roughness of said surface, means for inverting said signal, and means for biasing said signal.

18. An apparatus for indicating the roughness of a surface comprising:
   a transducer having a sensing end positioned adjacent a portion of said surface, said transducer adapted to generate an output signal corresponding to the distances between its sensing end and the points on said surface making up said portion;
   means for moving said surface past said sensing end; and,
   means for continually modifying the output signal of said transducer which is generated while said surface is moving by quantities corresponding to the inverse of the average distance from the sensing end of said transducer to its adjacent surface portion.

19. The apparatus as recited in claim 18 wherein said continual modifying means comprises:
   means for providing a signal indicating the inverse of said average distance; and,
   a multiplier adapted to receive said transducer generated signal and said inverse distance indicating signal to provide said modified transducer generated signal.

20. The apparatus as recited in claim 18 wherein said inverse distance indicating signal providing means comprises a low-pass filter adapted to receive the transducer generated signal to attenuate those frequency components in said signal arising from roughness of said surface, means for inverting said signal and means for biasing said signal.

21. The apparatus as recited in claim 18 and further including a bandpass filter through which said transducer generated signal is passed to attenuate all frequency components in said signal except those of a predetermined range arising from a particular size range of surface irregularities.

22. The apparatus as recited in claim 21 and further including means for rectifying said modified transducer signal, means for averaging the rectified signal over a known distance of said surface and means for indicating said averaged result.

23. The apparatus as recited in claim 18 and further including a high pass filter through which said transducer generated signal is passed to attenuate those frequency components in said signal arising from non-uniform movement of said surface causing the distance between said surface and said sensing end to vary.

24. A method of indicating the roughness of a surface with a transducer having a sensing end positioned adjacent a portion of said surface and which generates an output signal corresponding to the distance between its sensing end and the points on said surface making up said portion, said method comprising:
   moving said surface past said sensing end; and,
   modifying the output signal of said transducer which is generated while said surface is moving to compensate for distortions in said signal due to different width bumps and depressions in said surface roughness.

25. The method as recited in claim 24 wherein said modifying comprising differentiating the transducer generated signal.

26. The method as recited in claim 25 and further comprising differentiating the already differentiated transducer generated signal.

27. The method as recited in claim 25 wherein said surface is moved past said sensing end at a constant velocity.

28. The method as recited in claim 27 and further comprising:
   filtering said transducer generated signal to attenuate low frequency components arising from non-uniform movement of said surface causing the distance between said surface and said sensing end to vary.

29. The method as recited in claim 27 and further comprising filtering said transducer generated signal to attenuate high frequency noise components.

30. The method as recited in claim 25 and further comprising continually modifying said transducer generated signal by quantities corresponding to the inverse of the average distance from the sensing end of said transducer to its adjacent surface portion as said surface is being moved.

31. The method as recited in claim 30 wherein said continual modifying step comprises providing a signal which continually indicates the inverse of the average distance between said sensing end of said transducer and its adjacent surface portion as said surface is being moved; and, multiplying said transducer generated signal by said inverse distance indicating signal to provide a modified transducer generated signal.

32. The method as recited in claim 31 wherein said inverse distance indicating signal is provided by filtering the undifferentiated transducer generated signal to attenuate those frequency components in said signal arising from roughness of said surface, inverting said signal, and biasing said signal.

33. A method of indicating the roughness of a surface with a transducer having a sensing end positioned adjacent a portion of said surface and which generates an output signal corresponding to the distance between its sensing end and the points on said surface making up said portion, said method comprising:
moving said surface past said sensing end; and,
continually modifying said transducer generated signal by quantities corresponding to the inverse of the average distance from the sensing end of said transducer to its adjacent surface portion as said surface is being moved.

34. The method as recited in claim 33 wherein said modifying step comprises providing a signal which continually indicates the inverse of the average distance between said sensing end of said transducer and its adjacent surface portion as said surface is being moved; and, multiplying said transducer generated signal by said inverse distance indicating signal to provide a modified transducer generated signal.

35. The method as recited in claim 34 wherein said inverse distance indicating signal is provided by filtering the undifferentiated transducer generated signal to attenuate those frequency components in said signal arising from roughness of said surface, inverting said signal, and biasing said signal.

36. The method as recited in claim 33 and further comprising filtering said transducer signal to attenuate all frequency components except those of a predetermined range arising from a particular size range of surface irregularities.

37. The method as recited in claim 33 and further comprising:
rectifying said modified transducer signal;
averaging the rectified transducer generated signal over a known distance of said surface; and,
indicating the value of said averaging result.

38. The method as recited in claim 33 and further comprising:
filtering said transducer generated signal to attenuate low frequency components arising from non-uniform movement of said surface causing the distance between said surface and said sensing end to vary.

* * * * *